United States Patent [19]
Spriegel

[11] Patent Number: 5,931,508
[45] Date of Patent: Aug. 3, 1999

[54] FLUID COUPLING

[75] Inventor: Clark F. Spriegel, Attica, N.Y.

[73] Assignee: Chapin Manufacturing, Inc., Batavia, N.Y.

[21] Appl. No.: 08/949,481

[22] Filed: Oct. 14, 1997

[51] Int. Cl.$^6$ ............................................. F16L 15/00
[52] U.S. Cl. ............................ 285/87; 285/92; 285/247
[58] Field of Search ............................ 285/82, 87, 92, 285/247

[56] References Cited

U.S. PATENT DOCUMENTS

| | | | |
|---|---|---|---|
| 3,069,187 | 12/1962 | Collins et al. | 285/82 X |
| 4,452,473 | 6/1984 | Ruschke | 285/92 X |
| 5,215,336 | 6/1993 | Worthing | 285/87 X |
| 5,362,110 | 11/1994 | Bynum | 285/87 |

Primary Examiner—Dave W. Arola
Attorney, Agent, or Firm—Jaeckle Fleischmann & Mugel, LLP

[57] ABSTRACT

A fluid coupling having a first part removably threadably connected to a second part, wherein one of the parts has a latch arm resiliently deformable by engagement with the projections incident to threading and unthreading of the first part on the second part. The projections and the latch arm have cooperating first cam surfaces and cooperating second cam surfaces arranged to engage one another and cooperating to require the application of relatively small and large forces to affect threading and unthreading of the first part relative to the second part.

6 Claims, 3 Drawing Sheets

FLUID COUPLING

BACKGROUND OF THE INVENTION

Compressed air sprayers typically include a tank for receiving liquid to be sprayed, a flexible tube leading from the tank to a manually operable flow control, a wand leading from the control and nozzle coupled to the wand. Threaded couplings are typically employed to connect the tube and wand to the control and the nozzle to the wand in order to permit these elements of a sprayer to be separated for cleaning/replacement purposes.

A problem encountered with prior threaded couplings, and particularly the one serving to couple the tube to the control, is that they tend to loosen during use, with the result that a user must periodically tighten such couplings to prevent the occurrence of leaks.

SUMMARY OF THE INVENTION

The present invention is directed towards an improved fluid coupling and more particularly, a coupling having threadably connected parts adapted to removably connect elements of a compressed air sprayer.

In accordance with the present invention, a fluid coupling having first and second threadably connected parts is formed in such a manner as to require a relatively small force to thread a first part onto a second part for coupling purposes and a relatively large manual force to unthread the first part relative to the second part for uncoupling purposes.

In the presently preferred construction, the first part is formed with radially outwardly extending projections, and the second part is formed with a resiliently deformable latch member arranged to overlie and engage with the projections incident to threading and unthreading of the first part. The projections and the latch member have cooperating first cam surfaces and cooperating second cam surfaces arranged to engage with one another to effect resilient deformation of the latch member each time the latch member is engaged by a projection incident to threading or coupling and unthreading or uncoupling rotations of the first part relative to the second part. The respective cooperating cam surfaces are arranged to permit threading of the first part with relatively little effort, while resisting unthreading of the first until a substantial turning force is applied to the first part.

BRIEF DESCRIPTION OF THE DRAWINGS

The nature and mode of operation of the present invention will now be more fully described in the following detailed description taken with the accompanying drawings wherein.

DETAILED DESCRIPTION

Figure 1:
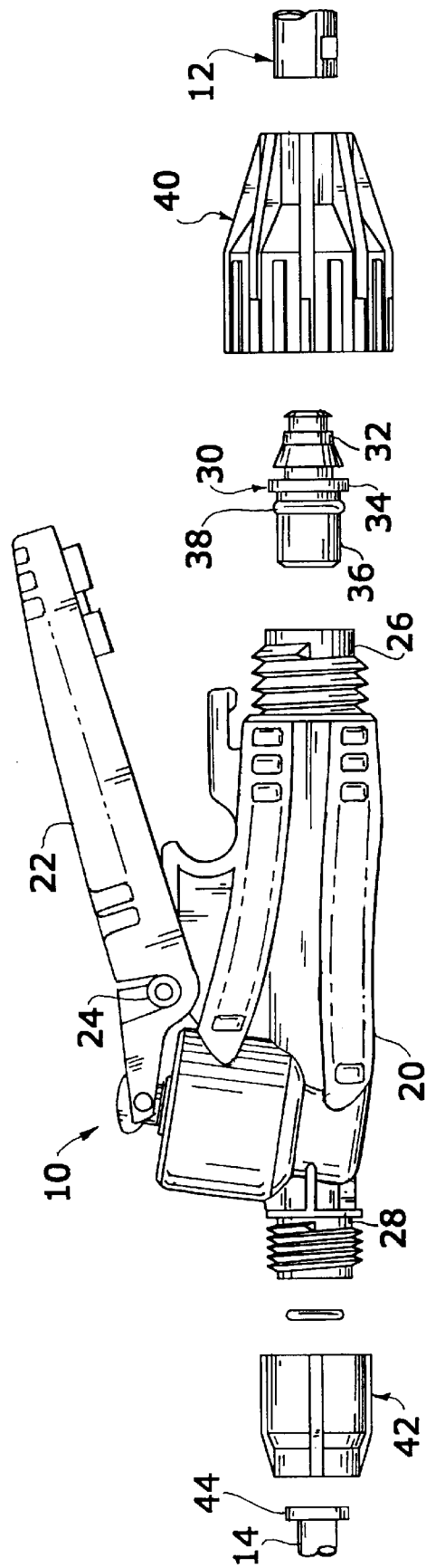
FIG. 1 is an exploded view showing use of the fluid coupling of the present to removably connect a flexible tube to a manually operable flow control of the type typically employed with a compressed air sprayer.
Figure 2:
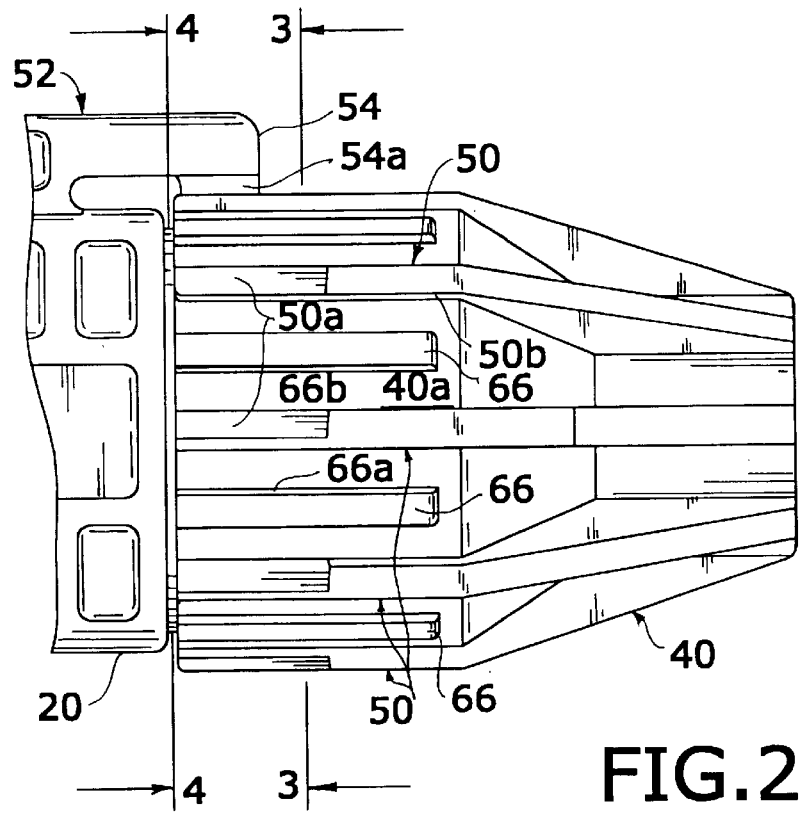
FIG. 2 is an enlarged fragmentary view showing the fluid coupling of FIG. 1 in an assembled condition.

In FIG. 1, there is shown a manually operable flow control 10 the type commonly used to control the flow of liquid from a portable, compressed air sprayer tank, not shown, via a flexible tube or hose 12 for discharge through a wand 14 and an adjustably mounted spray discharge nozzle, also not shown.

Control 10 has a body portion 20 provided with a lengthwise extending through fluid flow passageway fitted with a shut-off valve, not shown, under the control of manually operable handle portion 22 pivotally supported on the body portion by a pivot pin 24, an externally screw threaded inlet end portion 26 bounding an inlet end of the through passageway and an externally screw threaded outlet end 28 of the through passageway.

Tube 12 is adapted to be removably attached to control body portion 20 in flow communication with its through passageway via a through bored hose barb 30 having a barbed end 32 insertable within the tube 12, an enlarged flange 34 and a tubular portion 36, which is insertable into inlet end portion 26 and serves to mount an O-ring seal 38. Flange 34 is adapted to be engaged by an internally screw threaded nut 40 for purposes of maintaining tubular portion 36 within inlet end portion 26.

Wand 14 is adapted to be removably attached to control body portion 20 in flow communication with its through passageway via an internally screw threaded nut 42, which is adapted to be threaded onto outlet end portion 28 to clamp wand mounting flange 44 thereagainst.

Remaining elements of a compressed air sprayer with which the elements of FIG. 1 are adapted for use include the above mentioned sprayer tank, which has a tank fill opening removably fitted with a closure serving in turn to removably mount a manually operable, tank contents pressurizing air pump, and a discharge fitting to which an end of tube 12 is coupled; and the above mentioned spray nozzle typically attached to wand 14 by providing a nozzle clamping nut removably threadable onto the end of the wand.

All of the elements of a compressed air sprayer, as thus far generally described, are of conventional construction and mode of operation.

The present invention will now be described as being in the form of an improved fluid coupling adapted for use in positively retaining a fluid seal between control 10 and tube 12; which coupling of prior sprayers oftentimes became loose during use of the sprayer, due to unthreading of nut 38 caused by manual manipulations of the control. As loosening of nut 40 progressed, a leak would tend to develop and a user was required to halt a spraying operation until the coupling was again tightened sufficiently to stop the leak.

More specifically, the present invention contemplates providing an improvement in a fluid coupling by which a user is allowed to exert a relatively small manual force to thread nut or a first coupling part 40 onto inlet end portion or second coupling part 26, while requiring a relatively large force to unthread nut 40, thereby serving to prevent the occurrence of leaks incident to use of a sprayer.

The present invention is best shown in FIGS. 3–6 as including at least one and preferably a plurality of radially outwardly extending projections defined for example by ribs 50, which are equally spaced apart annularly of the cylindrical outer surface 40a of nut 40 and arranged to extend lengthwise or axially thereof; and at least one resiliently deformable latch member 52, which is fixed to body portion 20 adjacent inlet end portion 26 and has a free end portion 54 arranged to overlie and engage with ribs 50 incident to threading and unthreading of nut 40 onto the inlet end portion.

Figure 3:
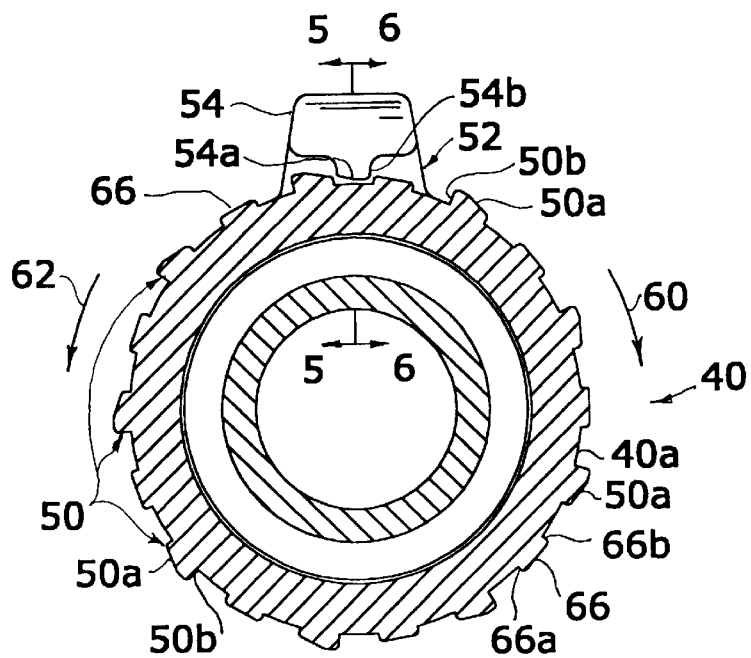
FIG. 3 is a sectional view taken generally along the line 3—3 in FIG. 2.
Figure 4:
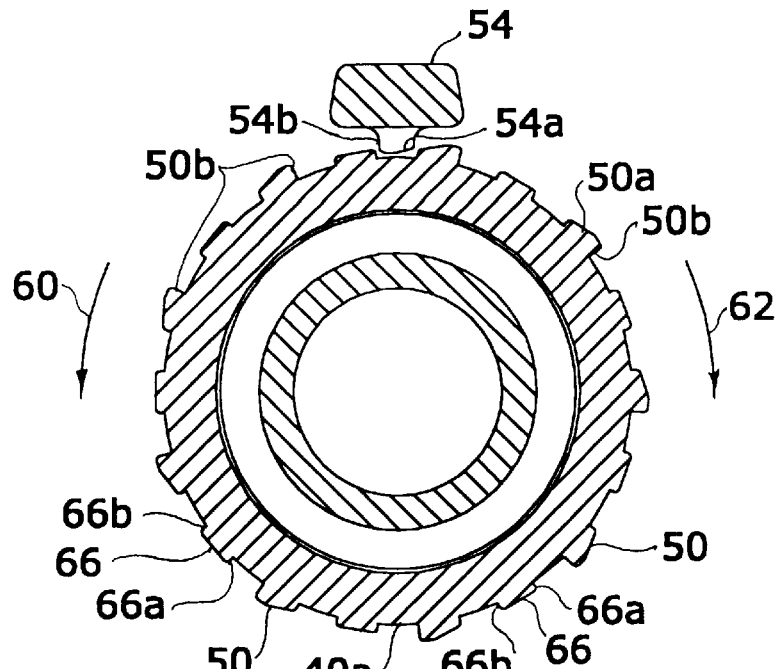
FIG. 4 is a sectional view taken generally along the line 4—4 in FIG. 2.
Figure 5:
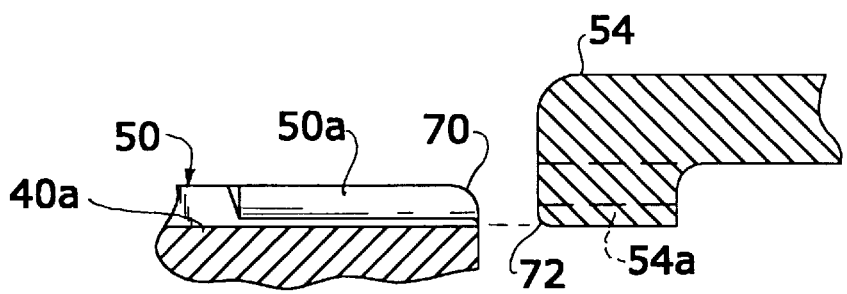
FIG. 5 is a sectional view taken generally along the line 5—5 in FIG. 3, but with the coupling parts arranged in axially spaced condition.
Figure 6:
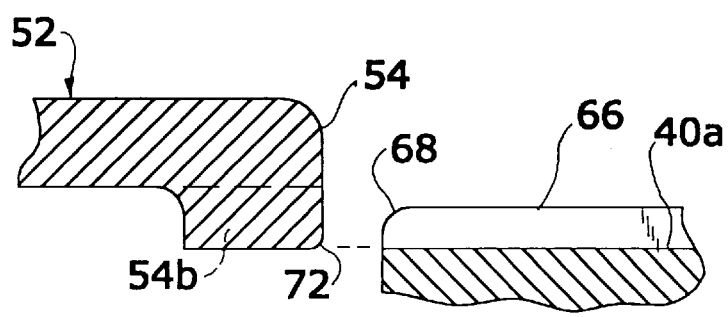
FIG. 6 is a sectional view taken generally along the line 6—6 in FIG. 3.

As best shown in FIGS. 3 and 4, ribs 50 and free end portion 54 have cooperating first cam surfaces 50a and 54a, and cooperating second cam surfaces 50b and 54b arranged to engage with one another to effect deformation of latch member 52, whenever nut 40 is threadably engaged with inlet end portion 26 and rotated in a threading or first direction designated by arrows 60 in FIGS. 3 and 4 and an unthreading or second direction designated by arrows 62, also shown in FIGS. 3 and 4.

As best shown in FIGS. 3 and 4, first cam surfaces 50a are defined by providing ribs 50 with a bevels facing in first direction 60 and first cam surface 54a is defined by providing free end portion 54 with a bevel arranged to face first cam surface 50a. Second cam surfaces 50b are defined by upstanding side walls of ribs 50 arranged to face in second direction 62 and second cam surface 54b is defined by providing free end portion 54 with a side surface arranged to face second cam surface 50b. As will be apparent, the relatively large angle defined by cam surfaces 50a and 54a provides a relatively large mechanical advantage allowing radially directed deformation of latch member 52 upon the application of a relatively small force operating to turn nut 40 in the direction of arrow 60. On the other hand, the relatively small angle between surfaces 50b and 54b, which is preferably little more than zero degrees, but in any case substantially less than the angle between the first cam surfaces, provides a relatively small mechanical advantage, which requires the application of a substantial operating force to turn or unthread nut 40 in the direction of arrow 62.

Accordingly, a user may thread nut 40 onto inlet end portion 26 sufficiently to provide an effective fluid seal without employing a manual operating force substantially greater than would normally be required for this purpose in the absence of the present invention. However, once the fluid seal is created, latch member 52 effectively opposes unintentional unthreading of nut 40 sufficiently to permit leaking of the coupling, while none-the-less permitting intentional unthreading of the nut for coupling disassembly for tube replacement/coupling cleaning purposes.

Further in accordance with the present invention, it is preferable to provide nut 40 with a plurality of reinforcing ribs 66 arranged intermediate and equidistant from pairs of adjacent ribs 50. It would also be preferable to round off the free ends of ribs 66, as well as ribs 50, as at 68 and 70, and to round off the free end of free end portion 54, as at 72, to facilitate initiation of coupling or threading of nut 40 onto inlet end portion 26.

The radially extending height of reinforcing ribs 66 is shown in FIGS. 3 and 4 as being substantially less than that of ribs 50, such that they effect only relatively minor deformations of latch member 52 passing thereover incident to the threading or unthreading of nut 40. Ribs 66 are provided with like rounded, lengthwise extending or parallel cam edges 66a and 66b arranged to engage with cam surfaces 54a and 54b incident to rotations of nut 40. The latch member deforming forces created by ribs 66, during rotations of nut 40, are substantially less than those caused by ribs 50.

The extent of the resilient deformation of latch arm 52 may be controlled varying the radial distance between free end portion 54 and nut outer surface 40a when the free end portion is in its initial or nondeformed state and the radial height of ribs 50. In the present construction, latch member 52 is sized/shaped to reside in an essentially undeformed condition when free end portion 54 is arranged in a facing relationship to nut outer surface 40a intermediate any of ribs 50 and 66.

While the present fluid coupling has been desirable as having ribs formed as part of an internally threaded nut and a latch member joined to an externally threaded end portion, it is contemplated that these elements may be reversed. Further, while the coupling of the present invention has been described as being employed for use in connecting a flexible tube to a manually operable flow control, it is contemplated that the present coupling has utility wherever it is desirable to prevent unthreading of coupling parts as in incident to relative movement of adjacent elements during use.

What is claimed is:

1. In a fluid coupling having a first part removably threadably connected to a second part, the improvement requiring a relatively small force to thread said first part onto said second part upon rotation of said first part in a first direction and requiring a relatively large force to unthread said first part from said second part upon rotation of said first part in an opposite direction comprising:

one of said first and second parts mounting a plurality of outwardly extending projections equally spaced annularly thereof and a plurality of radially extending reinforcing ribs arranged one between each pair of adjacent projections, said reinforcing ribs having a radial height less than said projections;

the other of said first and second parts mounting at least one resiliently deformable latch member arranged to overlie and engage with said projections and said reinforcing ribs incident to threading and unthreading of said first part relative to said second part;

wherein said projections, said reinforcing ribs, and said latch member each have cooperating first cam surfaces and cooperating second cam surfaces with said cam surfaces on said projects and on said reinforcing ribs arranged to engage with said cam surfaces on said latch member to effect deformation of said latch member each time said latch member is engaged by said projections and said reinforcing ribs incident to rotation of said first part in said first and second directions, respectively, and said first and second cam surfaces are arranged to effect deformation of said latch member upon the application of relatively small and large forces to thread and unthread, respectively, said first part relative to said second part.

2. The improvement according to claim 1, wherein said second cam surfaces, when engaged, define an included angle greater than zero, but less than an included angle defined by said first cam surfaces, when engaged.

3. The improvement according to claim 1, wherein said projections, said reinforcing ribs and said latch member have the facing free ends thereof rounded off to facilitate initiation of threading of said first part onto said second part.

4. The improvement according to claim 3, wherein said second can surfaces, when engaged, define an included angle greater than zero, but less than an included angle defined by said first cam surfaces, when engaged.

5. In a coupling for use in removably attaching a flexible tube to a manually operable flow control of a compressed air sprayer comprising an internally screw threaded nut, an externally screw threaded end portion defining a fluid inlet of said flow control and a hose barb having a barb end insertable into said tube, a flange and a tubular end removably inserted within said threaded end portion and retained therewithin by engagement of said flange by said nut upon the threading of said nut onto said threaded end portion; the improvement comprising;

a plurality of parallel ribs equally spaced apart annularly on said nut and extending radially thereof, and a plurality of radially extending reinforcing ribs arranged one between each pair of adjacent parallel ribs, said reinforcing ribs having a radial height less than said parallel ribs; and a resiliently deformable latch member carried by said flow control and having a free end portion arranged to overlie and engage with said parallel ribs and said reinforcing ribs incident to threading and unthreading of said nut relative to said threaded end portion in first and second directions, respectively;

wherein said parallel ribs, said reinforcing ribs, and said free end portion of said latch member each have cooperating first cam surfaces and cooperating second cam surfaces with said cam surfaces on said parallel ribs and said cam surfaces on said reinforcing ribs arranged to engage with said cam surfaces on said latch member to effect deformation of said latch member each time said free end portion is engaged by one of said parallel ribs or said reinforcing ribs incident to rotation of said nut relative to said free end portion in said first and second directions, respectively, said second cam surfaces when engaged defining an included angle greater than zero but less than an included angle defined by said first cam surfaces when engaged, said first and second cam surfaces being arranged to require the application of relatively small and relatively large forces to rotate said nut relative to said free end portion in said first and second directions, respectively.

6. The improvement according to claim 5, wherein said parallel ribs, said reinforcing ribs and said free end portion of said latch member have the facing ends thereof rounded off to facilitate initiation of threading of said nut onto said threaded end portion.

\* \* \* \* \*